Dec. 11, 1956  H. L. BOWDITCH  2,773,664
RESTRICTOR VALVE
Filed Feb. 18, 1954
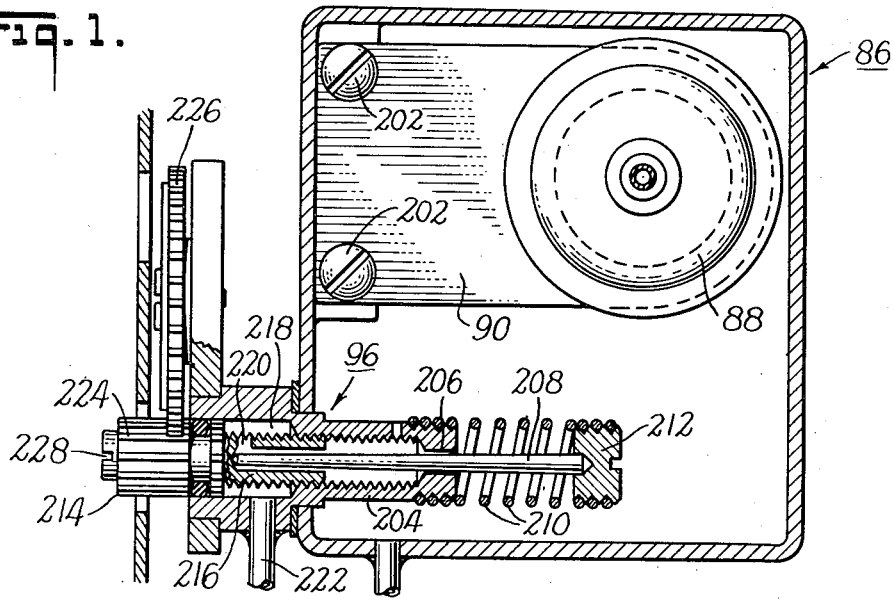
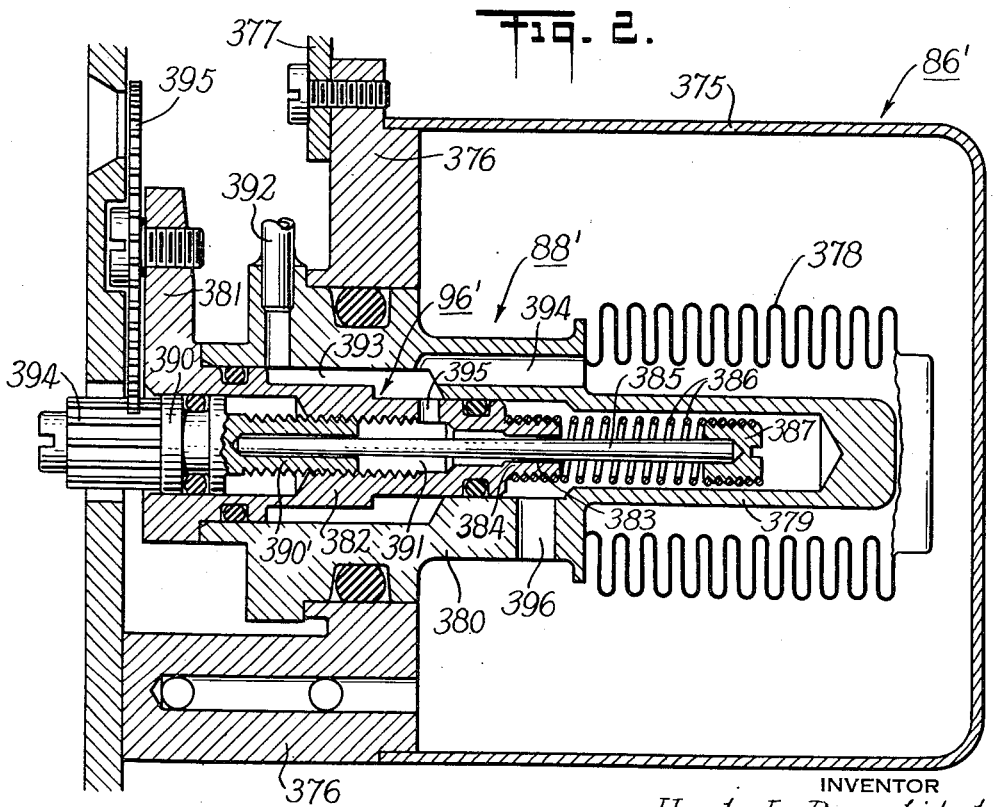
INVENTOR
Hoel L. Bowditch
BY
Curtis, Morris + Safford
ATTORNEYS United States Patent Office 2,773,664
Patented Dec. 11, 1956

2,773,664

RESTRICTOR VALVE

Hoel L. Bowditch, Foxboro, Mass., assignor to The Foxboro Company, Foxboro, Mass., a corporation of Massachusetts Application February 18, 1954, Serial No. 411,168

1 Claim. (Cl. 251—276)

This invention relates to valves for adjustably restricting the flow of an elastic fluid and more particularly is concerned with a constant length capillary restrictor of the taper pin type disclosed in my U. S. patent application No. 320,754 filed November 15, 1952, now Patent No. 2,742,917, of which the present application is a continuation-in-part.

My said application discloses an automatic controller of the pneumatically operated type used in industrial work. When such a controller embodies automatic reset and/or derivative action, means must be provided to restrict the rate of flow of the operating fluid in parts of the controller circuit. In order to match or attune the reset or derivative action of the controller to the characteristics of the process to be controlled, the rate of flow through the restrictor must be varied; hence the reason for an adjustable restrictor. Reliability of the restrictor to precisely regulate very small flows is of great importance, as either plugging or leaks alter undesirably the operating characteristics of the controller. Capillary resistors of various kinds have been employed in an effort to attain desired reliability of action. Various sorts of needle valves have also been used.

While the desired rangeability could be attained through the needle valve, such valve had undesirable characteristics in that it was over critical at one end of its range and was apt to lose its settings. Also if the needle valve should carelessly be closed too tightly the valve seat might be scored. Furthermore it was found difficult to produce a needle valve with a packed stem which would be tight and free from leaks under the small flow conditions encountered in a controlled reset circuit. This was a serious weakness. To overcome these disadvantages the present adjustable restrictor, the size of a needle valve, but functionally a capillary of fixed length and bore was developed. Accordingly it is an object of the present invention to provide an adjustable restrictor valve which will avoid the weaknesses and disadvantages above set forth and provide other positive advantages. A further object is to provide a simple, inexpensive and reliable device of the nature set forth. Other objects of the invention will be in part obvious and in part pointed out hereinafter. This invention accordingly consists in the features of construction, combination of elements, and arrangement of parts as well as exemplified in the structure to be hereinafter described and the scope of the application of which will be indicated in the following claims.

In the accompanying drawings in which is shown one of the various possible embodiments of the invention, and also a modification thereof;

Figure 1 is a vertical section through the center of the derivative tank and variable restrictor valve, corresponding to Figure 13 of the said prior application Serial No. 320,754 and Figure 2 is a similar vertical section of a modified form of tank and restrictor valve.

In general, the present adjustable restrictor consists of a long pin having a very slight taper, operating in a passageway having a taper parallel to that of the pin. The pin is movably positioned in the passageway axially, without turning, thus changing the area of the annular space around the pin in the passageway. The width of the annulus is always such that the flow is streamline. Thus the desired characteristics of the "capillary" are maintained and the area of the annulus may be adjusted over a range much greater than required for most process reactions.

While this device is composed of separate parts, the problem of leakage is eliminated because the taper pin does not rotate, and by the use of an O-ring on the adjustment screw. The screw moves the pin in a direction to increase the clearance between pin and bore, the pin being opposed by a coaxial spring, and under tension. With such construction there is no danger of galling or jamming the pin or destroying the relationship between pin portion and area. Calibration is simply a matter of setting zero, and once done the dial markings match the flow rates as determined by the precise dimensions of the tapered passageway and pin.

An important feature of this tapered pin valve is the attainment of a reproducible orifice. For when valve is moved and returned to original setting, size and shape of orifice are the same. To assure such reproducibility it is necessary that the valve be precisely centered in respect to the valve seat so that the width of annular opening is uniform.

*Derivative tank and restriction valve*

Referring to Figure 1 of the drawings a derivative tank 86 is suitably mounted in relation to the control circuit with which it operates. This tank contains the bellows 88 which is secured at one end to a wall of the tank. The other end of the bellows 88 is urged toward said one end by a leaf spring 90 which is secured to the tank wall by screws 202.

The tank 86 is provided with a restrictor valve generally indicated by the numeral 96. This valve comprises an internally threaded tubular member 204 secured in the tank wall and having at its inner end a tapered passage 206 forming a seat for a tapered pin valve 208. The valve pin 208 is urged to the left, as shown in Figure 1, by a spring 210 which is connected at its left end to the extension of tubular member 204 and at its right end to a spring adapter 212 that engages the right end of valve 208. The passage 206 and valve pin 208 have the same taper and the passage walls of 206 are parallel to the walls of the pin and constitute a seat for the valve. Spring 210 tends to urge valve pin 208 toward its seat 206, thereby closing the valve.

The valve member or pin 208 is moved to the right to open the valve by means of a valve-actuating member 214 that is threaded into the member 204. The actuating member 214 has a tubular extension 216, within which the left-hand end of valve pin 208 is positioned. Tubular member 204 has a section of enlarged diameter that cooperates with the extension 216 to define an annular space 218 communicating with the interior of extension 216, and thus with valve seat 206, through a port 220. The annular space 218 is also in communication with a tube 222 through which air is supplied to and withdrawn from the derivative tank 86. The valve 96 is adjusted to regulate flow of air to and from the derivative tank by a rotation of the actuating member 214 which moves the valve member 208 coaxially within the interior of the spring 210, in contact with the adapter 212, and against the tension of the spring.

The outer end of valve actuating member 214 is provided with a gear 224 that meshes with a dial gear 226 calibrated to indicate the magnitude of the derivative effect. The front of the actuating member 214 is provided with a kerfed head 228 to facilitate adjustment of the valve with a screw driver.

Referring to Figure 2, a modified form of restrictor valve 96' is shown as mounted in a bellows member 88', which, in turn, is mounted within a modified form of derivative tank 86'. The tank 86' comprises a shell 375 suitably mounted upon a casting 376 which may be supported upon a plate 377 suitably associated with the apparatus to be controlled. At the right end, as seen in Figure 2, the member 88' carries the bellows proper 378 which surrounds a hollow closed end cylindrical portion 379 extending outwardly from the larger portion 380 which is supported in the aforesaid casting 376.

At its left end, said portion 380 provides a cylindrical opening adapted to receive and support the tubular housing 381 of the restrictor valve 96'. This valve comprises an internally threaded tubular member 382 mounted in the member 380 and having at its inner end a tapered passage 383, within an extension 384, and forming a valve seat for a tapered valve pin 385. The pin is urged to the left, as shown in Figure 2, by a spring 386 connected at its left end to extension 384 of member 382 and at its right end to a spring adapter 387 that engages the right end of said pin.

As in the form shown in Figure 1, the passage 383 and valve pin 385 have the same taper and the passage walls of 383 are parallel to the walls of the pin and constitute a seat for the valve. Spring 386 tends to urge valve pin 385 toward its seat 383, with uniform annular space between pin and seat whenever the pin has been moved longitudinally away from and then returned to any particular lengthwise position.

The valve pin 385 is moved to the right to open the valve by means of a valve actuating member 390 that is threaded into the member 382. The member 390 has a tubular extension 390' within which the left hand end of valve pin 385 is centrally positioned. The said extension 390' cooperates with tubular section 382 to define an annular space 391 surrounding the valve pin 385. A fluid connection 392 communicates with an annular space 393 directly connected by means of a port 394 with the interior of the bellows 378. The space 393 surrounds the body of member 382 within the member 380 and communicates by means of a port 395 with the space 391 within the valve body and thus connects via the valve seat 383 with the interior of the closed tubular extension 379; thence through port 396 with the interior of the tank 375. Thus full fluid pressure obtains within the bellows member, while a controlled lower pressure within the tank opposes the pressure within the bellows. The valve 96' is adjusted to regulate flow of air to and from the derivative tank by a rotation of actuating member 390 which moves the valve member 385 within the spring 386, in contact with the adapter 387, and against the tension of the spring. As in the first embodiment of the invention, as shown in Figure 1, the outer end of the valve actuating member 390 is provided with a gear 394 that meshes with a dial gear 395 calibrated to indicate the magnitude of the derivative effect. Otherwise the modification shown in Figure 2 closely follows the design of Figure 1. However certain advantages are attained by the use of the derivative valve and its direct combination with the bellows member, such as a lowering of the cost of production, economy of space and greater ease in the installation of the unit. It is to be noted that O-ring gaskets employed herein ensure tight fits between all wall surfaces.

From the foregoing description it shall be apparent that the present invention provides a restrictor valve unit capable of achieving the several objects outlined at the beginning of the present specification.

It is, of course, to be understood that the foregoing description is to be taken as illustrative only, and not in a limiting sense.

I claim:

A valve for adjustably restricting the flow of an elastic fluid comprising, in combination, a valve body having a relatively long uniformly tapered passage formed therein, a uniformly tapered valve pin having substantially the same angle of taper as said passage and extending through said passage, a valve-pin-guide cap spaced from said valve body and having a central recess therein in which the larger end of said pin is positioned, a coil spring co-axially surrounding said pin and interconnecting said cap and said valve body adjacent to said passage, said spring being in tension to urge said pin in a direction to cause the pin to completely close said passage, and an adjusting member threaded into said valve body and positioned to engage said valve pin to move it against the tension of said spring to open said valve, said adjusting member having an axial bore formed therein within which the smaller end of said valve pin is positioned said adjustable member, said cap and said spring cooperating to maintain said valve pin co-axial with said passage and spaced from the wall of said passage except when said valve is fully closed.

References Cited in the file of this patent

UNITED STATES PATENTS

| | | |
|---|---|---|
| 971,162 | Winkler | Sept. 27, 1910 |
| 1,068,909 | Langsdorff | July 29, 1913 |
| 1,199,152 | Bruce | Sept. 26, 1916 |
| 1,911,561 | Fitts | May 30, 1933 |
| 2,037,908 | Kimball | Apr. 21, 1936 |
| 2,094,864 | Abell | Oct. 5, 1937 |
| 2,230,093 | Tate | Jan. 28, 1941 |
| 2,452,956 | Robins | Nov. 2, 1948 |
| 2,537,051 | Grant | Jan. 9, 1951 |
| 2,552,766 | Bowar | May 15, 1951 |
| 2,599,286 | Rockwell | June 3, 1952 |

FOREIGN PATENTS

| | | |
|---|---|---|
| 379,258 | France | Sept. 4, 1907 |